United States Patent
Li (10) Patent No.: US 6,832,210 B1
(45) Date of Patent: Dec. 14, 2004

(54) MARKET NEUTRAL PAIRTRADE MODEL

(75) Inventor: Bin Li, Westport, CT (US)

(73) Assignee: Westport Financial LLC, Westport, CT (US)

(*) Notice: Subject to any disclaimer, the term of this patent is extended or adjusted under 35 U.S.C. 154(b) by 843 days.

(21) Appl. No.: 09/639,325

(22) Filed: Aug. 16, 2000

Related U.S. Application Data (60) Provisional application No. 60/149,068, filed on Aug. 16, 1999.

(51) Int. Cl.[7] .................................................. G06F 17/60
(52) U.S. Cl. ............................... 705/36; 705/1; 705/37
(58) Field of Search ............................................ 705/36

(56) References Cited

U.S. PATENT DOCUMENTS 5,590,325 A * 12/1996 Kolton et al. ................... 707/3

FOREIGN PATENT DOCUMENTS

WO   WO 01/75695 A2 * 11/2001  ........... G06F/17/60

OTHER PUBLICATIONS

Market Neutral Strategy, AAstocks.com, 2000.*

* cited by examiner

Primary Examiner—James P. Trammell
Assistant Examiner—John Winter
(74) Attorney, Agent, or Firm—St. Onge Steward Johnston & Reens LLC (57) ABSTRACT

A process for implementing a market neutral relative value strategy to provide up-to-the-minute equity trading recommendations includes selecting pairtrades, each having both high correlation coefficient and high de-trended correlation coefficient. The de-trended coefficient is determined for a time interval selected such that a starting price of one of the stocks of a pairtrade is substantially equal its ending price. The process further includes calculating an optimal financial hedge ratio by determining regression slopes of the stocks in each selected pairtrade with respect to one another. The selected pairs are further compared with a plurality of templates to select only valid pairtrades whose amplitude and number of crosses through and deviations from the regression line match at least one of the templates. Applying a modified LaGrange-Urenbeck process to determine the optimal cut-loss and profit taking boundaries further optimizes each of the valid pairtrades.

27 Claims, 5 Drawing Sheets

|  | SHARES | SYMBOL | ENTRY | LAST | CHANGE | BID | ASK | SIZE(100s) BID X ASK | P&L | CAPITAL |
|---|---|---|---|---|---|---|---|---|---|---|
| LONG | 1,000 | WMT | 51.69 | 51 3/8 | 3/8 | 51 3/8 | 51 7/16 | 3 X 100 | -311.59 | 51375 |
| SHORT | 779 | SLR | 38.5 | 38 9/16 | 1/16 | 38 9/16 | 38 11/16 | 38 X 12 | -145.81 | 30040.19 |
|  | PROFIT TARGET | | 2630 | CUT LOSS LIMIT | | -2120 | | TOTAL | -457.4 | 81415.19 |

INSTRUCTIONS
1. ALWAYS CLOSE TRADE IF THE CUT-LOSS LIMIT (RED-LINE) IS REACHED
2. TAKE PROFIT PROMPTLY OF THE PROFIT TARGET IS REACHED (GREEN LINE)
3. NEVER LET THE TRADE TURN A LOSER AFTER IT MADE A PROFIT HIGHER THAN HALF THE PROFIT TARGET. ALWAYS TRADE AFTER 5 TRADING DAYS.

FIG. 11

MARKET NEUTRAL PAIRTRADE MODEL

This application is based on provisional patent application 60/149,068 filed Aug. 16, 1999.

FIELD OF THE INVENTION

The invention relates to a computerized system and a method for implementing a market neutral pairtrade model producing a low risk, high yearly return. Specifically, the invention relates to a computerized system for implementing a pairtrade strategy, wherein the correlation strength between two stocks of a pairtrade is determined such that fortuitous high correlation between these two stocks is substantially excluded. Particularly, the invention relates to a computerized system utilizing a market neutral relative value strategy wherein an optimal symmetric financial hedge ratio between stocks of selected pairtrades is calculated to produce the trading profits substantially overcoming transaction costs.

BACKGROUND OF THE INVENTION

Nobel Laureate Bill Sharpe says it will "revolutionize the investment management industry." Famed financial planner Harold Evensky calls it "the best thing since sliced bread." That thing is the market-neutral strategy.

In theory, market-neutral strategies insulate investors from stock-market volatility. Typically, a market-neutral investor uses a computer software to rank thousands of stocks according to how over- or underpriced they are. The investor buys a collection of the underpriced stocks and "neutralizes" these purchases by short-selling an equal dollar amount of the overpriced stocks. These strategies make money in a bull market if the owned stocks gain more than the short sales lose.

Each market-neutral manager puts a different spin on the basic strategy. One might screen for stocks using price/earnings ratios while another prefers earnings-growth rates. Some managers try to balance their purchases and short sales within individual sectors and market caps. Others might make small sector bets, overweighing financial stocks, for example, and shorting technology issues. One of these strategies is a correlation/convergence trading strategy (also called statistical arbitrage) designed to make profits without taking significant directional risk. Specifically, this strategy is a trade idea based on the principle that when the price of a stock (or stock portfolio) significantly deviates from its long-term trend, it will sooner or later converge (move back) back to its original trend. For example, a trading strategy that generates a buy signal at every dip of the stock price in a general up trend is a convergence trading strategy.

The convergence strategy primarily focuses on liquid price signals that are significantly strongly correlated. The correlation is defined as the linear regression correlation coefficient of a stock portfolio (or a single stock) and a benchmark over a certain period of time. For example, one can compute the correlation coefficient of IBM stock with respect to the S&P 500 index over the past 6 months. The meaning of correlation coefficient can be simply put this way: if the index moves up, and the correlation coefficient is X, then X percent of the time the stock also moves up.

Figure 1:
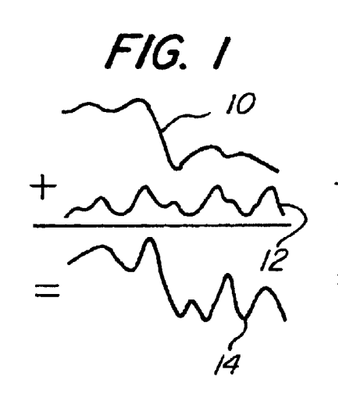
FIG. 1 is a graph illustrating a random or memory less market signal component and an oscillating component summed together to indicate a modified stock price of a single stock.

Basically, the majority of market-neutral strategies work because the market prices of stocks may not have a random, chaotic character, as seems to be the case by following memory-less stochastic or Markov processes. These are the processes in which the future distribution of a variable depends only on the variable's current value. Stock prices are widely assumed to follow a Markov process. However, as illustrated in FIG. 1 and widely accepted in the investment industry, the typical stock price may be represented as a combination of a random or memory less market signal 10 and an oscillating or swinging rhythmical signal 12 of relatively small amplitude. Further, it has been noted that similar stocks, such as stocks of similar companies in the same industry, are usually well correlated.

Figure 2:
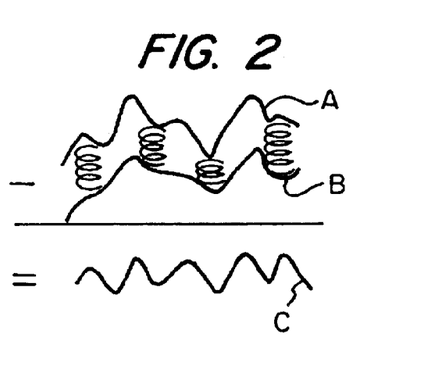
FIG. 2 is a graph illustrating a pairtrade system.

Considering an individual stock, it may be noticed that the main component of the price signal is the memory-less signal 10, as shown in FIG. 1. It is because of this overwhelming influence of the random signal, a mean reverting price signal 14 calculated as a sum of the two components of the rice E signal may not be satisfactory reliable. As a result, it is difficult to consistently make profits. In order to enhance a chance of making profits, it was proposed to in trade two or more stocks simultaneously in order to minimize the memory-less 1 component and, at the same time, to rely on the oscillating rhythmic component in the price differential of at least two stocks. In other words, a group of stocks is selected such that the stocks' random components in the overall trading position are cancelled out, leading to a well defined oscillating and mean reverting price signal. This is illustrated in FIG. 2, showing two related stocks A and B as if they are connected by a spring. The difference between these stocks is an oscillating and mean reverting price signal C, which can be easily traded on: buy lows and sell highs.

In practical terms, as has been explained above, this market neutral portfolio management strategy is based on a classic hedge: a manager looks at stocks in pairs, buying the one he expects to perform best and selling short the one he expects to underperform. The concept has been generalized to accommodate long and short portfolios with different performance expectations.

As ideally as it sounds, the common practice in utilizing the neutral market strategy may not be entirely satisfactory. First of all, while analyzing related stocks, investors typically use the level or daily change correlation coefficient "r" as a measure of correlation strength between two stocks.

The correlation coefficient is a measure (ranging in value from −1 to 1) of the association between a dependent variable and one or more independent variables. If one variable's values are higher than its average value when another variable's values are higher than its average value, their correlation will be positive. By contrast, if one variable's values are lower than its average value when another variable's values are higher than its average value, their correlation will be negative. Thus, this coefficient is not necessarily a measure of causality, but it does indicate the strength of a relationship. A correlation coefficient of 1 implies that the variables move perfectly in lockstep; a correlation coefficient of 1 implies that the variables move inversely in lockstep; a correlation coefficient of 0 implies that the variables, as calibrated, are uncorrelated. Applying this measure to a pairtrade, it may not exclude fortuitous high correlation. For example, if two totally unrelated stocks or even loosely related stgcks both increase their prices in last few months, a high level of correlation will indicate this trend. Yet, this similarity may rather be explained by the fact that the economy as a whole experiences unprecedented growth, which indiscriminately positively affects a great majority of stocks.

Further, assuming that stock pairs have been "correctly" selected, the question arises as to how many shares of an overpriced stock should be shorted versus how many shares of a related underpriced stock should be acquired. For example, if two stocks are weakly correlated, the conventional linear regression slope will be very slightly inclined or near zero. This tells the investor to buy one stock without short selling any shares of the second stock, because shorting the second stock is not going to reduce the total variance of the two-stock portfolio. However, in reality, as mentioned before, if the market suddenly drops significantly, all stocks most likely will tend to drop proportionally. As a consequence, the investor is going to loose a golden opportunity of making profits on an overpriced stock, shares of which he could have sold but did not. In order to avoid this possibility, many financial institutions determine a market neutral hedge. The determination first involves calculating a conventional regression slope "x" (FIG. 5) of the time series of the prices of one of the stocks $S_1$ of the selected pair relative to the other stock $S_2$. Further, a conventional regression slope "y" (FIG. 5) of the time series of the prices of the stock $S_2$ is determined against the first stock $S_1$. The common practice is to use either x or 1/y as the hedge ratio to achieve the market neutral hedge, which is basically directed at not loosing. However, this hedge ratio may not be an optimal financial hedge which should be ideally directed at making profits. In a market crash, the good financial hedge is the dollar hedge, namely putting the same amount of capital in both the long and the short positions. In contrast, in a pairtrade, there is no distinction between which stock is used as the security to be hedged or the hedging instrument. Ironically, the hedge ratio between the selected stocks is not symmetrical. Traders randomly pick up one of the regression slopes, as described above, and assume that either one of these slopes will lead to the same result. In reality, the results are different and directly depend on which one of the regression slopes is selected.

Further, once a pairtrade is selected, it is necessary to provide sophisticated computerized support helping the traders to optimize cut-loss and profit-taking time points. This is typically achieved by the use of mathematical models that may not be entirely satisfactory.

It is, therefore, desirable to provide a market neutral pairtrade system allowing a trader to choose at least one pair of stocks in a manner that is relatively independent from the influence of market trends on the determination of the correlation strength between these stocks. Also, it is desirable to provide a market neutral pairtrade system operating with an optimal hedge symmetrical hedge ratio to achieve an optimal financial hedge. Further, a market neutral pairtrade system which is provided with a series of tests, including a plurality of templates which are empirically determined to have profitable hedge ratio patterns, to further discard the previously selected pairs that do not show a strong correlation with any of the templates is desirable. Also, a method of operating a market neutral pairtrade system is desirable as well.

SUMMARY OF THE INVENTION

The invention achieves these objectives by overcoming the disadvantages known in the known prior. Accordingly, one of the aspects of the invention discloses a market neutral pairtrade system in which a plurality of pairtrades selected by the trader, who uses the level or daily change linear regression coefficient "r", is further reduced. This is achieved by computing another de-trended correlation coefficient r_d between stocks of each of tte selected pairs which is determined by substantially equal starting and ending price values within a relatively short time. Only those pairs which have both the high correlation coefficient "r" and the high de-trended coefficient $r_{13}$ d will be further analyzed in accordance with the inventive method.

In accordance with another aspect of the invention, the thus selected pairs of correlated stocks are further evaluated by determining a pair of linear regression slopes between the stocks of each pair in order to calculate an optimal symmetrical financial hedge ratio.

Still, in accordance with a further aspect of the invention, the pairs after having been checked with the optimal symmetrical financial hedge undergo a battery of tests to further limit their number. This is achieved by comparing a a general trend of a graph illustrating the correlation between the stocks of each of the selected pairs to a great number of historically determined templates which illustrate most profitable correlation trends. Only after passing the general trend pattern recognition step, the remaining pairs are checked with respect to their amplitudes, number of crosses through the regression line, and the number of standard deviations away from the this line to the last point. All of the remaining pairtrades are presumed to be valid.

Finally, in accordance with another aspect of the invention, the optimal cut-loss and profit taking strategy line indicating when to buy and short-sell is constructed on a basis of the modified LaGrange-Urenbeck process.

It is therefore an object of the invention to provide a market neutral pairtrade system which is operated on a basis of a de-trended correlation measure for reducing the chance of fortuitous correlation between selected pairs of correlated stocks.

Another object of the invention is to provide a market neutral pairtrade system utilizing an optimized symmetric financial hedge ratio to improve the effectiveness of stock hedging in order to obtain an optimal financial hedge.

Still another object of the invention is to provide a market neutral pairtrade system implementing the use of template-matching and further screening technique to further reduce a number of the selected pairs of correlated stocks.

A further object of the invention is to utilize a modified LaGrange-Urenbeck process to find a profit-taking and cut-loss strategy that optimizes the expected profit.

Yet a further object of the invention is to provide a computerized method operating the market neutral pairtrade system in accordance with the invention.

BRIEF DESCRIPTION OF THE DRAWINGS

The above and other features, objects and advantages will become more readily apparent from the following description, references being made to the following accompanying drawings, in which.

DETAILED DESCRIPTION OF THE DRAWINGS

Figure 3:
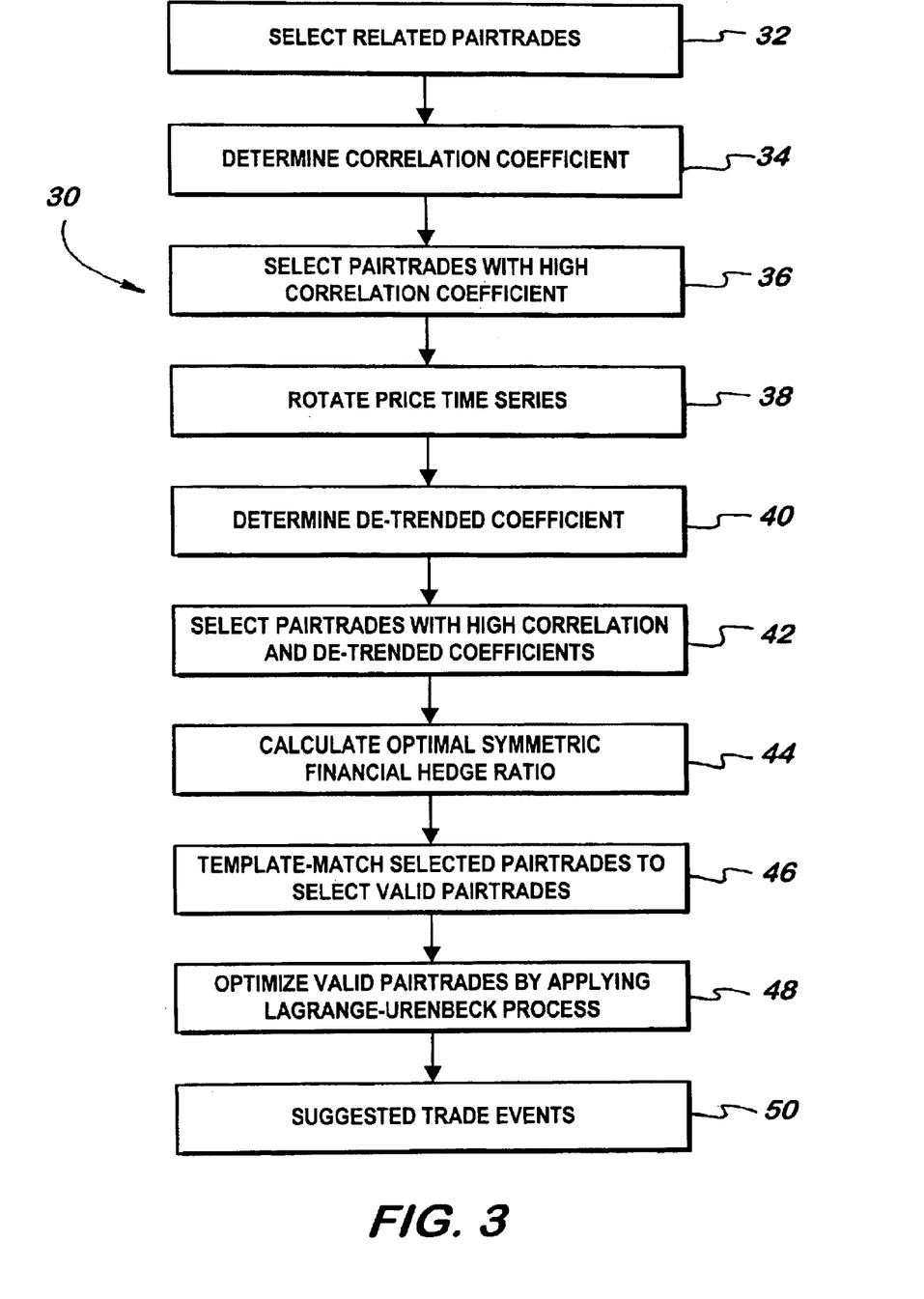
FIG. 3 is a flowchart of a market neutral pairtrade system in accordance with the invention.

Referring to FIG. 3, a flow chart illustrating an inventive neutral market pairtrade system 30 is shown. The real time trading system 30 is designed to provide up-to-minute equity trading recommendations based on a combination of a pair or a group of similar socks that can produce a yearly return of 60%±17%. Although the inventive system 30 is a continuous process, it may be identified as a four-step trading strategy.

Particularly, the system provides access to a market server to survey hundreds of stocks. The ultimate goal of the financial analyst is to allow a software to select a pool of pairs of related or similar stocks or pairtrades. Clearly, different criteria can be applied to choose and combine these pairtrades. For example, the software 32 may concentrate on any particular industry, such as the software industry, similar companies and the like. As has been explained before, similar stocks are usually well correlated. Their prices tend to move together, and their price differential tends to fluctuate relatively synchronously, as shown in FIG. 2.

However, even within a well defined group of pairtrades it is easy to single out only those pairtrades that have a high correlation coefficient "r", which is easily determined at 34 in accordance with the known methodology that does not need to be explained here. The pairtrades with the thus determined coefficient are selected at 36. Suffice it to say, that the correlation coefficient indicates substantially proportional relationship between the market index and a given stock. As noted before, traders traditionally use the daily change correlation coefficient as a measure of the correlation strength between two stocks. Yet, this coefficient is dependent upon a market trend and, thus, may not be adequately indicative of the correlation strength between the stocks of a pairtrade.

Accordingly, one aspect of the invention relates to a stage at which the market trend influence on the determination of the correlation strength is significantly diminished. Specifically, another correlation coefficient, which is termed a de-trended correlation coefficient "r_d", is determined and used along with the standard coefficient to select pairtrades which have both high correlation and de-trended coefficients. Given purely as an example, a 0.88 coefficient is considered to be acceptably high.

The de-trended coefficient is determined at 38 in accordance with the same methodology as the regular one, but within a specifically selected period of time, which is characterized by substantially the same stock price in the beginning and the end of this period. In other words, the software de-trends at least one price series of a respective stock of each pairtrade by a rotation so that the starting value equals the ending value.

Figure 4:
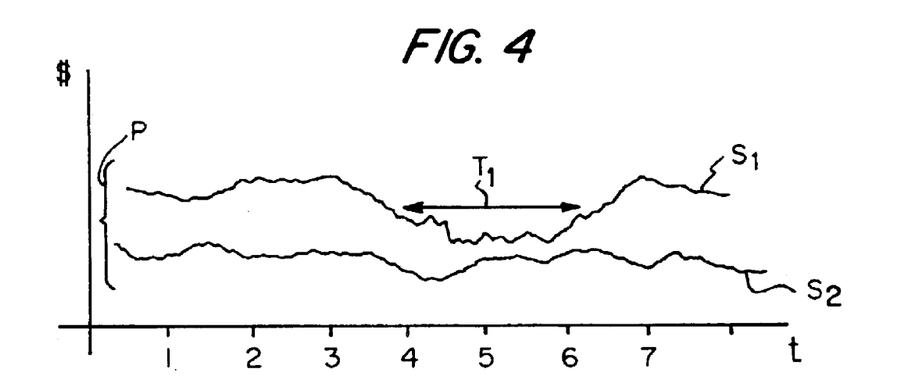
FIG. 4 is a graph illustrating a de-trended correlation which is used by the neutral market pairtrade system in accordance with the invention.

Referring to FIG. 4 illustrating the inventive concept, it is easy to see that a stock $S_1$ of a pairtrade P during a three-week period $T_1$ has its initial and ending prices substantially the same. A software selects pairtrades with the determined period and calculates the de-trended coefficient for each of them.

Turning back to FIG. 3, only those pairtrades that have been determined to have both the conventional coefficient and de-trended one are selected at 40 for the further analysis.

Having selected the pairtrades of interest, a trader has to reduce risks associated with any stock trading by hedging his or her portfolio at 42. Hedging means the specific actions the trader takes to neutralize the risks and typically involves three steps. First, analyze the trader's portfolio to identify and quantify risks and their sources. Second, in accord with an inventive calculation strategy, add, remove, and adjust holdings so that the risks are reduced or neutralized. Third, execute the trades necessary to implement the trader's new portfolio. Hedging can be as simple as short selling parts of an overpriced stock while buying parts of an underpriced stock of a pairtrade. The key is to know how much to sell and how much to buy which is defined at 44 in the following manner.

Figure 5:
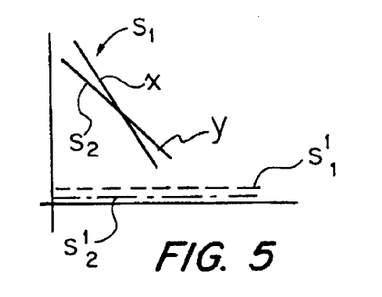
FIG. 5 is a graph illustrating conventional linear regression slopes of weakly or un-correlated two stocks and highly correlated stocks.

Referring to FIG. 5, an "x" is the conventional linear regression slope of the time series of the prices of $S_1$ stock of one of the selected pairtrades against the time series of the prices of the other stock of this pairtrade. A "y" is the conventional linear regression slope of the time series of the prices of $S_2$ stock against the time series of the prices of the $S_1$ stock of the same pairtrade. As explained above, the common practice among traders is to use either "x" or "1/y" as the hedge ratio to achieve a market neutral hedge, provided that the stocks are strongly correlated. In essence this linear regression hedge is a minimum variance hedge calculated such that a trader may rather not loose in a market crash. For example, as shown in dash lines, if two stocks $S_1'$, and $S_2'$ were weakly correlated or not correlated at all, the conventional linear slope of one stock relative the other will be near zero. This tells the trader to buy one stock without short selling the other, because shorting the second stock is not going to reduce the total variance of the two-stock portfolio. However, as mentioned above, if the market suddenly drops significantly, all stocks most likely will tend to drop proportionally. Thus, using the conventional market neutral hedge, a trade puts the same amount of capital in both long and short positions.

In contrast, in a pairtrade, there is no distinction between which stock is a hedging instrument and which one is a hedged one. As a result, traditionally, traders randomly pick only one of the stocks as a hedging instrument to calculated either "x" or "1/y" regression slope. In reality, however, the hedge ratio is different if the trader further decides to calculate the other regression slope.

Accordingly, an optimal symmetrical financial hedge ratio taking into account the above-discussed asymmetry between the regression slopes of the stocks of the same pair is calculated as follows:

as $r_s = \frac{1}{2}[S^2+4]^{1/2}$, wherein $s = x - 1/y$, wherein r is an optimal financial hedge ratio.

Figure 6:
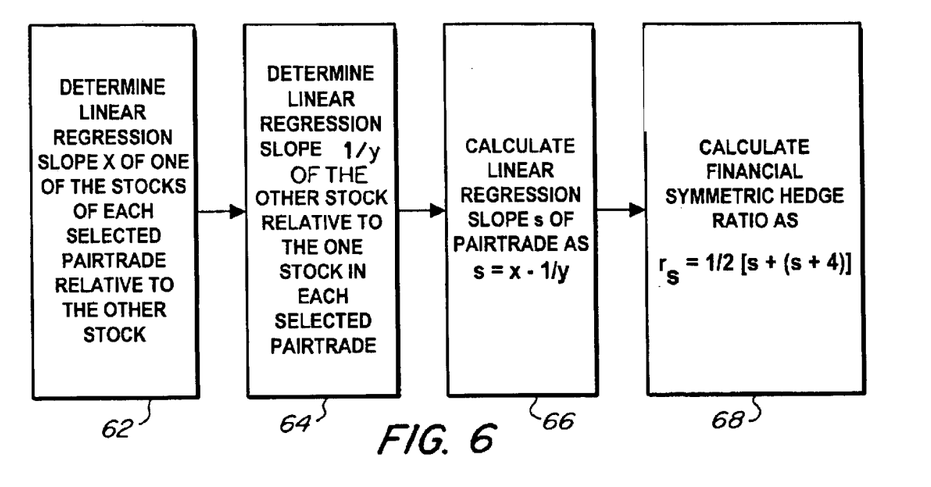
FIG. 6 is a flow chart illustrating a sequence for calculating an optimal symmetric financial hedge ratio.

Thus, as illustrated in FIG. 6, a trade is able to first calculate the "x" conventional slope at 62, then the "1/y" conventional slope 64, and finally determine a neutral slope at 66, which would allow the trader to determine the optimal hedge ratio at 68. Using this optimal hedge ratio, a trader instead of conservatively playing not to loose, is given an opportunity to make profits by controllably shorting overpriced stock while, at the same time, buying the underpriced stock of the pairtrade in accordance with the inventive hedge ratio.

Figure 7:
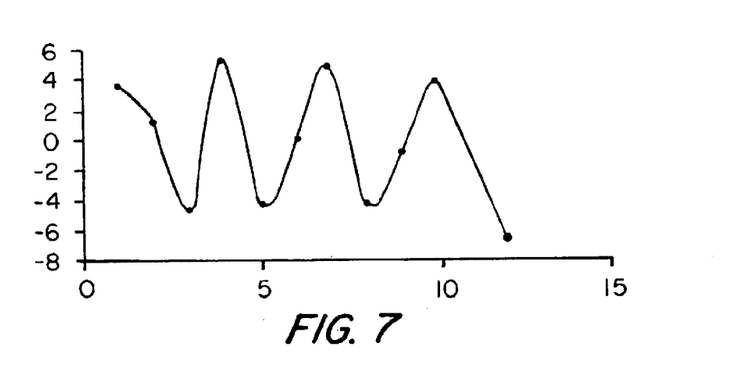
FIG. 7 is a graph illustrating one of the stored templates with a reference correlation line.

After a trader selected the pairtrades having high correlation and de trended coefficients and computed the optimal symmetric financial hedge ratio, each of the selected pairtrades is compared to a plurality of templates at 46, which historically represent the best returns. A number of the templates is purely empirical and can run as high as several hundreds and even thousands templates. Just for illustrative purposes, a hundred and eight (108) templates are currently used for evaluation. Each of these templates may represent the difference between the prices of two stocks that have been grouped together to constitute a long-time successful pairtrade stored in a database, which can be accessed by the analyst. Thus, a reference amplitude, number of crosses through the regression line, and number of standard deviations away from the regression line for the last point characterize each of the templates. FIG. 7 shows one of the templates with a regression line corresponding to a 0 level.

Figure 8:
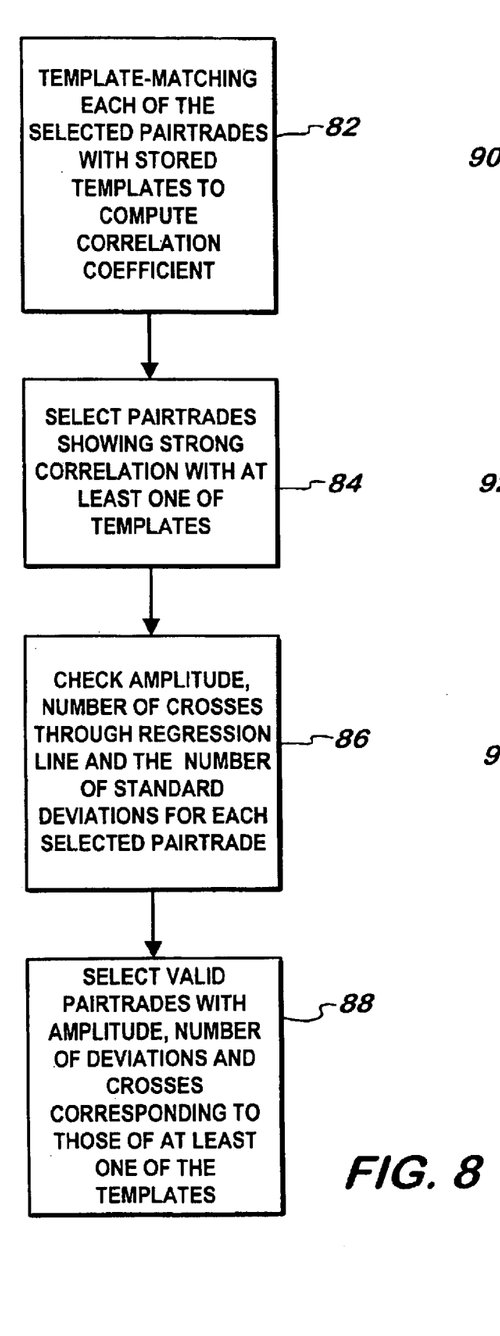
FIG. 8 is a flow chart illustrating a template-matching process for final selection of pairtrades predicted to produce high financial returns.

Returning to FIGS. 3 and 8, each of the selected pairtrades is template-matched with each of the stored templates at 46 to compute a correlation coefficient between each of the selected pairtrades and the template. As shown in FIG. 8, if the calculated coefficient passes the reference value at 82, each of the remaining pairtrades selected at 84 is further screened to have its number of deviations from and crosses through a regression line correspond to those of at least one of the templates at 86. Only, if a pairtrade passes all of these screening tests, and therefore matches at least one of the templates, this pairtrade is termed valid at 88. Non-valid pairtrades are discarded.

Once a valid pairtrade is put on, the trader always needs to monitor the progress at 48. In accordance with another aspect of the invention, an optimal dynamic model controllably identifies time events at 50 when the trader is advised to take profits by shorting and buying stocks of a valid pairtrade as the trade proceeds through the time. The model further is designed to automatically interrupt trading when the pairtrade reaches a pre-set cut-loss level.

The basic assumption in describing the model is that the pairtrade follows the modified LaGrange-Urenbeck process, $$d^2p/dt^2 = \lambda N_1(\mu,\sigma) - \zeta dp/dt - k(p-p_0)$$

which is a weak oscillator under a strong random force. In this formula p and $p_0$ are profit-taking and cut-loss boundaries, respectively. To calculate these boundaries based on the above described model, the software solves the following differential equation of the probability density function to dynamically determine the cut-loss levels and/or profit taking levels:

$$E(p-p_0) = \int p(t, p_t, I_{cut}, I_{take\_profit}, \lambda\zeta k)(p-p_0) d\Omega(t,p)$$

Figure 9:
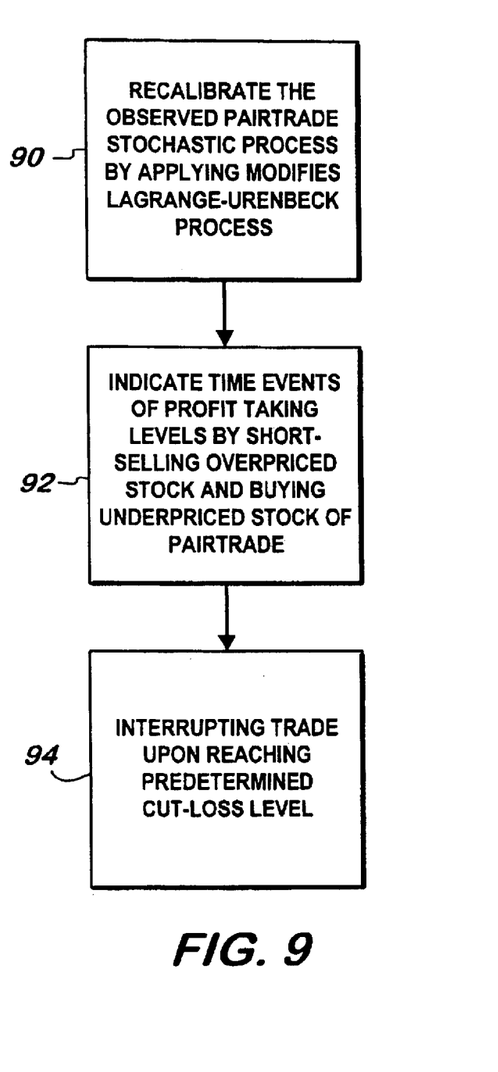
FIG. 9 is a flow chart illustrating an optimization step of the process shown in FIG. 3.

Referring to FIG. 9, the model can be described as a three-step system which illustrates an evolving trend of the valid pairtrade at 90. Further, the model implements a software that indicates the time events representing recommendations to the trader to short sell an overpriced stock and to buy an underpriced stock of the pairtrade at 92. Thus, according to the invention, a mean reverting signal of the pairtrade in a convergence trading system tells a trader to cut losses if the trade looses an $N, take profits if the trade makes an $M and get out of the trade it if it makes half the target profit and then drops back to $0. Typically, profit taking levels correspond to time events when the stocks $S_1$ and $S_2$ of the valid pairtrade substantially diverge from one another. Further, as a converging trend becomes well articulated, a trader is recommended to switch the buying strategy with respect to the stocks and buy the stock $S_2$ while shorting his $S_1$ stock.

Figure 10:
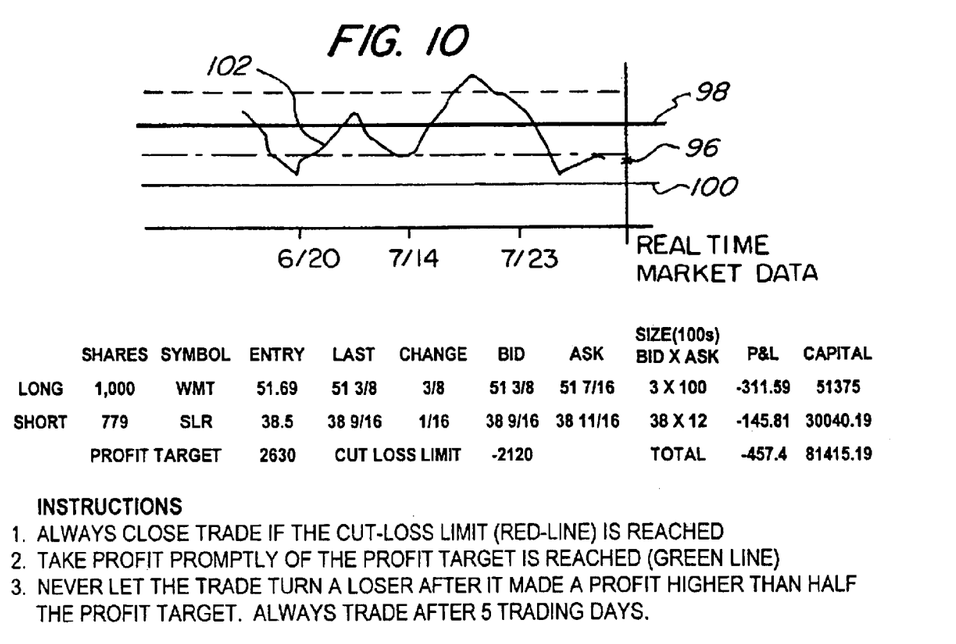
FIG. 10 is a graphical representation of a pairtrade optimized in accordance with the sequence shown in FIG. 9.

Referring to FIG. 10, which illustrates a graphical representation of pairtrade 102 as modified by the LaGrange-Urenbeck process in accordance with the invention, a line 100 represents the dynamically determined cut-loss limit. Following the instructions the trader is recommended to close trade. Upon reaching a line 98, which represents a profit-taking level, the trader is instructed to take profit promptly. Finally, a point 96 represents the entry time for the pairtrade. The data information is equally important for the trader since it indicates howmany shares one is recommended to "long" and how many shares of the pairtrade the trader is instructed to "short" along with other important information helping the trader to make an intelligent choice.

Figure 11:
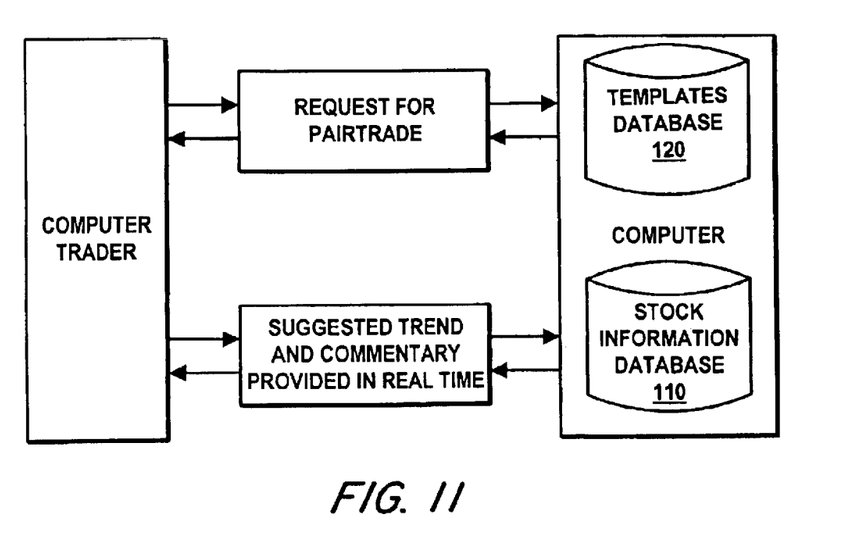
FIG. 11 is a simplified diagrammatic view of a system implementing the process of FIG. 3.

As shown in FIG. 11, a computerized system implementing a market-neutral trading strategy, which may be a divergence or convergence strategy, utilizes a first database 110, which stores data relating to stocks for possible pairtrades. These stocks are selected as those showing a smooth and steady trend over a reasonably long period of time. The system periodically, for example every ten minutes, searches all possible convergence/divergence pairtrade opportunities. A pair is considered an attractive candidate if it shows a stable and strong converging or diverging trend. A second database 120 stores the templates and searches for either two converging or diverging stocks, wherein one is a relatively strong performer and the other is a weak performer, in accordance with the inventive process. Then one goes long on the strong stock and short the weak stock, so that one realizes a profit as the two stocks continue to converge or diverge while the long/short structure keeps the overall trading position hedged against uncertain market movements. Finally, the system may periodically post the thus determined opportunities. Alternatively, the system may respond to a request by a trader and by utilizing the process of the invention post the pairtrade of interest in real time.

Although the invention has been described with reference to a particular arrangements of parts, features and the like, these are not intended to exhaust all possible arrangements or features, and indeed many other modifications and variations will be ascertainable to those of skill in the art.

What is claimed is:

1. A process for implementing a market neutral relative value strategy to provide up-to-the-minute equity trading recommendations, comprising the steps of:

(a) retrieving stock data from a stock information database and determining a correlation coefficient for every possible pair of stocks representing a respective pairtrade at least in part based upon said retrieved stock data;

(b) defining a plurality of pairtrades with the high correlation coefficient;

(c) rotating a price time series of at least one stock in each of the every possible pairtrade for determining an interval of time in which a starting price equals its ending price, so that the correlation between the stocks of each pairtrade within a respective determined interval is relatively independent from a market trend;

(d) determining a de-trend correlation coefficient for every possible pairtrade within the respective interval of time determined in step (c);

(e) selecting pairtrades having both the high correlation and high de-trend correlation coefficients;

(f) calculating an optimal symmetric financial hedge ratio for each of the selected pairtrades;

(g) retrieving a plurality of stored templates representing historically acceptable returns from a templates database and calculating a template correlation coefficient between each of the selected pairtrades with said plurality of stored templates, thereby selecting valid pairtrades that highly correlate with at least one of said plurality of templates; and (h) optimizing each of the valid pairtrades by applying a modified LaGrange-Urenbeck process to determine the optimal cut-loss and profit taking boundaries;

wherein at least one of steps (a) through (h) is performed by software executing on a computer.

2. The process defined in claim 1 wherein step (f) comprises the steps of determining a conventional linear regression slope "x" of the time series of prices of one of the stocks relative the other stock in each pairtrade and further calculating a conventional linear regression slope "y" of the time series of prices of the other stock relative the one stock of each pairtrade.

3. The process defined in claim 2 wherein the optimal hedge ratio is calculated as $r_s=\frac{1}{2}[S+(s^2+4)^{1/2}]$, wherein $s=x-1/y$.

4. The process defined in claim 1 wherein each of the selected pairtrades is compared with 108 templates to compute 108 correlation coefficients and discard pairs that show deviation from the reference correlation with any of the templates.

5. The process defined in claim 1 further comprising the step of calculating the difference between the stock price series of each selected pairtrade to determine a respective oscillating and mean-reverting signal, the oscillating and mean-reverting signal having an amplitude, number of crosses through a respective regression line, and a number of standard deviations away from the regression line, each of the templates representing a difference between stock price series of a pair of similar stocks and having a reference amplitude, a reference number of standard deviations from a regression line and a reference number of crosses through the regression line.

6. The process defined in claim 5 further comprising the step of sequentially comparing the amplitude, number of crosses and standard deviation of each of the oscillating and mean reverting signals of the selected pairs to each reference amplitude and reference number of crosses and standard deviations, respectively.

7. The process defined in claim 6 wherein the valid pairtrades ar e determined only upon passing each of the comparisons between the amplitude and number of crosses and standard deviations of each selected pairtrade and the reference amplitude and number of standard deviations and crosses of at least one template.

8. The process defined in claim 1 wherein the step of optimizing includes monitoring the progress of each selected pairtrade within a future short period of time to determine a plurality of optimal profit taking and cut-losses levels.

9. The process defined in claim 8 further comprising the step of triggering transactions at each of the profit taking levels.

10. The process defined in claim 8 further comprising the step of automatically interrupting trading upon reaching the determined cut-losses levels.

11. A process for implementing a market neutral relative value strategy to provide up-to-the-minute equity trading recommendations, comprising the steps of:

(a) retrieving stock data from a stock information database and determining a correlation coefficient for every possible pair of stocks representing a pairtrade at least in tart based upon said retrieved stock data;

(b) defining pairtrades having the high correlation coefficient;

(c) determining an interval of time in which a starting price for at least one of the stocks of each pairtrade equals its ending price, thereby diminishing the influence of a market trend on the correlation between stocks;

(d) determining a de-trend correlation coefficient for every possible pair of stocks within the respective interval of time determined in step (c), thereby defining pairtrades with high correlation de-trend coefficient;

(e) selecting pairs of stocks having both the high correlation and high de-trend correlation coefficients; and (f) calculating an optimal hedge "$r_s$" ratio for each of the selected pairtrades by:

($f_1$) determining a first hedge ratio "x", wherein one of the stocks of each of the selected pairtrades is used as a hedging instrument and the other as a hedged instrument;

($f_2$) determining a second hedge ratio "y", wherein the other stock of each of the selected pairtrades is used as a hedging instrument and the one as a hedged instrument, and ($f_3$) calculating the optimal rs ratio to achieve a return;

wherein at least one of steps (a) through (f) is performed by software executing on a computer.

12. The process defined in claim 11 wherein the optimal hedge ratio is calculated as $r_s=\frac{1}{2}[S+(s^2+4)^{1/2}]$, wherein $s=x-1/y$.

13. The process defined in claim 11 further comprising the steps of calculating a template correlation coefficient between each of the selected pairtrades and a plurality of stored templates representing historically the best returns, thereby selecting only those pairtrades that highly correlate with at least one of said plurality of templates, and optimizing each of the selected pairtrades by applying a modified LaGrange-Urenbeck process to determine the optimal cut-loss and profit taking boundaries.

14. A process for implementing a market neutral relative value strategy to provide up-to-the-minute equity trading recommendations, comprising the steps of:

(a) selecting pairs of stocks having the high correlation and de-trend correlation coefficients;

(b) calculating an optimal symmetric financial hedge ratio "$r_s$" to achieve a financial return by calculating two market neutral hedges for each of the selected pairtrades and correlating the hedges with one another; and (c) retrieving a plurality of stored templates representing historically acceptable returns from a templates database and calculating a template correlation coefficient between each of the selected pairtrades and a said plurality of stored templates, thereby selecting valid pairs of stocks that highly correlate with at least one of said plurality of templates;

wherein at least one of steps (a) through (c) is performed by software executing on a computer.

15. The process defined in claim 14 wherein step (b) comprises the steps of determining a first hedge ratio "x", wherein one of the stocks of each of the selected pairtrades is used as a hedging instrument and the other as a hedged instrument, determining a second hedge ratio "y", wherein the other stock of each of the selected pairtrades is used as a hedging instrument and the one as a hedged instrument, and calculating the optimal $r_s$ ratio as $r_s=\frac{1}{2}[S+(s^2+4)^{1/2}]$, wherein $s=x-1/y$.

16. The process defined in claim 14 wherein step (a) comprises the steps of comparing the amplitude, number of crosses and standard deviation of a difference representing an oscillating signal of each selected pairtrade to reference amplitude and reference number of crosses and standard deviations of each of the templates, respectively.

17. The process defined in claim 14, further comprising the step of optimizing each of the valid pairtrades by applying a modified LaGrange-Urenbeck process to determine the optimal cut-loss and profit taking boundaries.

18. A process for implementing a market neutral relative value strategy to provide up-to-the-minute equity trading recommendations, comprising the steps of:
    (a) selecting pairs of stocks having the high correlation and de-trend correlation coefficients;
    (b) calculating an optimal symmetric financial hedge ratio "$r_s$" to achieve a financial return by calculating two market neutral hedges for each of the selected pairtrades and correlating the hedges with one another; and
    (c) calibrating each of the selected pairtrades by applying a modified LaGrange-Urenbeck process to determine optimal cut-loss and profit taking boundaries that optimize the expected profit of the selected pairtrades by
        ($c_1$) monitoring the progress of each selected pairtrade within a future short period of time to determine a plurality of optimal profit taking and cut-losses levels,
        ($c_2$) triggering transactions at each of the profit taking levels, and
        ($C_3$) automatically interrupting trading upon reaching the optimal cut-losses levels;
    wherein at least one of steps (a) through (c) is performed by software executing on a computer.

19. The process defined in claim 18 wherein the optimal cut-loss level is dynamically determined.

20. The process defined in claim 18 wherein the optimal cut-loss level is predetermined.

21. A computerized trading system for implementing a market neutral pairtrade strategy to provide up-to-the-minute equity trading recommendations, comprising:
    at least one computer;
    software executing on the computer for calculating a correlation coefficient for every possible pair of price time series of two stocks representing a respective pairtrade;
    software executing on the computer for determining a plurality of pairtrades with the high correlation coefficient;
    software executing on the computer for determining a time interval in which a starting price of at least one stock of each pairtrade equals its ending price, so that the correlation between the stocks of each pairtrade within the respective determined time interval is relatively independent from a market trend; software executing on the computer for calculating a de-trend correlation coefficient for every possible pairtrade within the respective determined time interval;
    software executing on the computer for selecting pairtrades having both the high correlation and high de-trend correlation coefficients;
    software executing on the computer for calculating an optimal symmetric financial hedge ratio for each of the selected pairtrades;
    software executing on the computer for calculating a template correlation coefficient between each of the selected pairtrades with a plurality of stored templates representing historically acceptable returns to select valid pairtrades that highly correlate with at least one of said templates; and
    software executing on the computer for optimizing each of the valid pairtrades by applying a modified LaGrange-Urenbeck process to determine future optimal cut-loss and profit taking boundaries within a relatively short period of time.

22. A computerized trading system for implementing a market neutral pairtrade strategy to provide up-to-the-minute equity trading recommendations, comprising:
    at least one computer;
    a first database having a plurality of pairtrades stored therein, each including a pair of related stocks; software executing on the computer for determining correlation and de-trend correlation coefficients of the stored pairtrades to select pairtrades with both high correlation and de-trend correlation coefficients;
    software for determining a first hedge ratio "x", wherein one of the stocks of each of the selected pairtrades is used as a hedging instrument and the other one as a hedged instrument;
    software for determining a second hedge ratio "y", wherein the other stock of each of the selected pairtrades is used as a hedging instrument and the one as a hedged instrument, and
    software for calculating the optimal symmetrical ratio $r_s=\frac{1}{2}[S+(s^2+4)^{1/2}]$, wherein s=x−1/y;
    a second database having a plurality of templates stored thereon and representing historically acceptable returns; and
    software for calculating a template correlation coefficient between each of the selected pairtrades and the stored templates, thereby selecting valid pairtrades that highly correlate with at least one of said plurality of templates.

23. A computerized trading system for implementing a market neutral pairtrade strategy to provide up-to-the-minute equity trading recommendations, comprising:
    at least one computer;
    a database having a plurality of pairtrades stored therein, each including a pair of related stocks;
    software executing on the computer for processing each stored pairtrade by calculating a correlation coefficient for a pair of price time series of stocks representing a respective pairtrade;
    software executing on the computer for determining pairtrades with the high correlation coefficient;
    software executing on the computer for determining a time interval in which a starting price of at least one stock of each pairtrade equals its ending price, so that the correlation between the stocks of each pairtrade within the respective determined time interval is relatively independent from a market trend;
    software executing on the computer for calculating a de-trend correlation coefficient for every possible pairtrade within the respective determined time interval;
    software executing on the computer for selecting pairtrades having both the high correlation and high de-trend correlation coefficients;
    software executing on the computer for calibrating each of the selected pairtrades by applying a modified LaGrange-Urenbeck process to determine optimal cut-loss and profit taking boundaries that optimize the expected profit of the selected pairtrades and including:
        software for monitoring the progress of each selected pairtrade to dynamically determine an optimal profit taking and cut-losses levels, software for triggering trades at each of the profit taking levels, and software for interrupting trading upon reaching the cut-loss levels.

24. A computerized trading system for implementing a market neutral pairtrade strategy to provide up-to-the-minute equity trading recommendations, comprising:

at least one computer;

a first database having a plurality of pairtrades stored thereon, each including a pair of related stocks;

software executing on the computer for processing the stored pairtrades to select pairtrades the stocks of which have both a correlation coefficient and a de-trend correlation coefficient above empirically threshold values;

software for calculating an optimal symmetric financial hedge ratio "$r_s$" to achieve a financial return by calculating two market neutral hedges for each of the selected pairtrades and correlating the hedges with one another;

a second database having stored therein a plurality of templates representing pairtrades with historically acceptable returns, each of the templates having a reference amplitude, number of crosses through the regression line and a number of standard deviations from the regression line;

software for calculating an amplitude, a number of crosses through the regression line and a number of standard deviations from the regression line of a mean reverting signal representative of a difference between the stocks of each selected pairtrade; and software for comparing the amplitude and number of crosses through and standard deviations of each of the selected pairtrades from a regression line to the reference amplitude and the reference number of crosses and deviations of each of a plurality of the templates to select valid pairtrades and discard pairtrades that do not match with at least one of the templates.

25. A computerized trading system for implementing a market neutral pairtrade strategy to provide up-to-the-minute equity trading recommendations, comprising:

at least one computer;

a first database having a plurality of pairtrades stored therein, each including a pair of related stocks, wherein one of the stock is overpriced and the other one is underpriced;

software executing on the computer for processing the stored pairtrades to select pairtrades the stocks of which have both a correlation coefficient and a de-trend correlation coefficient above empirically threshold values;

a second database having stored therein a plurality of templates representing pairtrades with historically acceptable returns;

software for comparing each of the selected pairtrades with a plurality of the templates to select valid pairtrades and discard pairtrades that do not match with at least one of the templates;

software executing on the computer for calibrating each of the selected valid pairtrades by applying a modified LaGrange-Urenbeck process to determine cut-loss and optimal profit taking boundaries that optimize the expected profit of the selected pairtrades; and software executing on the computer for generating a graphical representation of the calibrated valid pairtrades, each having a first line representing the cut-loss level, a second line representing a profit target level between profit taking boundaries and the real time commentary.

26. The computerized trading system defined in claim 25 wherein the real time commentary illustrates how many shares of the underpriced stock are recommended to be "longed" and how many shares of the overpriced stock are recommended to be "shorted."

27. A process for implementing a market neutral relative value strategy to provide up-to-the-minute equity trading recommendations, comprising the steps of:

(a) determining a correlation coefficient for every possible pair of stocks representing a respective pairtrade;

(b) defining a plurality of pairtrades with the high correlation coefficient;

(c) rotating a price time series of at least one stock in each of the every possible pairtrade for determining an interval of time in which a starting price equals its ending price, so that the correlation between the stocks of each pairtrade within a respective determined interval is relatively independent from a market trend;

(d) determining a de-trend correlation coefficient for every possible pairtrade within the respective interval of time determined in step (c);

(e) selecting pairtrades having both the high correlation and high de-trend correlation coefficients;

(f) calculating an optimal symmetric financial hedge ratio for each of the selected pairtrades;

(g) calculating a template correlation coefficient between each of the selected pairtrades with a plurality of stored templates representing historically acceptable returns, thereby selecting valid pairtrades that highly correlate with at least one of said plurality of templates;

(h) optimizing each of the valid pairtrades by applying a modified LaGrange-Urenbeck process to determine the optimal cut-loss and profit taking boundaries; and (i) presenting a chart in a web-page demonstrating live time selected and calibrated pairtrade with historical data and template having a coordinate line showing a real time starting trading position, a coordinate line demonstrating a cut-loss position and a coordinate line demonstrating a profit taking position.

* * * * *